(12) United States Patent
Morozumi

(10) Patent No.: US 6,570,571 B1
(45) Date of Patent: May 27, 2003

(54) IMAGE PROCESSING APPARATUS AND METHOD FOR EFFICIENT DISTRIBUTION OF IMAGE PROCESSING TO PLURALITY OF GRAPHICS PROCESSORS

(75) Inventor: Yuichi Morozumi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/489,892

(22) Filed: Jan. 24, 2000

(30) Foreign Application Priority Data

Jan. 27, 1999 (JP) .......................... 11-018814

(51) Int. Cl.[7] .............................. G06F 15/80
(52) U.S. Cl. ................ 345/505; 345/522; 712/208; 709/105
(58) Field of Search ............... 345/505, 522, 345/530, 536, 501, 502; 712/200, 201, 203, 208, 209; 709/105

(56) References Cited

U.S. PATENT DOCUMENTS

| 5,325,493 A | * | 6/1994 | Herrell et al. ............. 712/201 |
| 5,485,559 A | * | 1/1996 | Sakaibara et al. .......... 345/505 |
| 5,781,199 A | * | 7/1998 | Oniki et al. ............... 345/505 |

FOREIGN PATENT DOCUMENTS

| JP | 4-348483 | 12/1992 |
| JP | 6-274608 | 9/1994 |
| JP | 08-153079 | 6/1996 |
| JP | 09/161280 | 6/1996 |
| JP | 9-147126 | 6/1997 |
| JP | 10-40360 | 2/1998 |
| JP | 10-171766 | 6/1998 |
| JP | 11-15986 | 1/1999 |

OTHER PUBLICATIONS

Kashima et al., Parallel Processing Series 14 Parallel Diagram Process, 3.9.2 Parallel Processing Machine that Uses Late Ranging, Aug. 15, 1991, pp. 102–112.

T. Abe et al., "Survey of Parallel Graphics Algorithm", Research Report of the Information Processing Society, vol. 1.94, No. 41, May 20, 1994, pp. 9–16.

* cited by examiner

Primary Examiner—Kee M. Tung
(74) Attorney, Agent, or Firm—Sughrue Mion, PLLC (57) ABSTRACT

An image processing apparatus comprising a plurality of graphics processors is disclosed. Each of the graphics processors calculates a load of its own processing on the basis of inputted and being processed graphics commands. If the load exceeds a preset specified threshold value, the graphics processor outputs a high-load signal indicating a high-load state. The image processing apparatus further comprises a command distributor. This command distributor monitors the high-load signal output from the graphics processor, prohibits transfer of the graphics commands to the graphics processor that has output the high-load signal, and then distributes the graphics commands to the other graphics processors that have output no high-load signals.

12 Claims, 10 Drawing Sheets

| | GTAPHICS COMMAND |
|---|---|
| 1 | GTAPHICS COMMAND A |
| 2 | GTAPHICS COMMAND B |
| 3 | GTAPHICS COMMAND D |
| 4 | GTAPHICS COMMAND B |
| 5 | GTAPHICS COMMAND C |
| 6 | GTAPHICS COMMAND C |

Fig.8

| GTAPHICS COMMAND | LOAD |
|---|---|
| GTAPHICS COMMAND A | 1 |
| GTAPHICS COMMAND B | 2 |
| GTAPHICS COMMAND C | 3 |
| GTAPHICS COMMAND D | 4 |

Fig.9

| | GTAPHICS COMMAND | LOAD |
|---|---|---|
| 2 | GTAPHICS COMMAND B | 2 |
| 3 | GTAPHICS COMMAND D | 4 |
| 4 | GTAPHICS COMMAND B | 2 |

Fig.10

| | GTAPHICS COMMAND | LOAD |
|---|---|---|
| 2 | GTAPHICS COMMAND B | 2 |
| 3 | GTAPHICS COMMAND D | 4 |
| 4 | GTAPHICS COMMAND B | 2 |
| 5 | GTAPHICS COMMAND C | 3 |

Fig.11

| | GTAPHICS COMMAND | LOAD |
|---|---|---|
| 3 | GTAPHICS COMMAND D | 4 |
| 4 | GTAPHICS COMMAND B | 2 |
| 5 | GTAPHICS COMMAND C | 3 |

Fig.12

| | GTAPHICS COMMAND | LOAD |
|---|---|---|
| 3 | GTAPHICS COMMAND D | 4 |
| 4 | GTAPHICS COMMAND B | 2 |
| 5 | GTAPHICS COMMAND C | 3 |
| 6 | GTAPHICS COMMAND C | 3 |

Fig.13

| | GTAPHICS COMMAND | LOAD |
|---|---|---|
| 4 | GTAPHICS COMMAND B | 2 |
| 5 | GTAPHICS COMMAND C | 3 |
| 6 | GTAPHICS COMMAND C | 3 |

Fig.14

| | GTAPHICS COMMAND | LOAD |
|---|---|---|
| 4 | GTAPHICS COMMAND B | 2 |
| 5 | GTAPHICS COMMAND C | 3 |

IMAGE PROCESSING APPARATUS AND METHOD FOR EFFICIENT DISTRIBUTION OF IMAGE PROCESSING TO PLURALITY OF GRAPHICS PROCESSORS

BACKGROUND OF THE INVENTION

The present invention relates to an image processing apparatus, which uses a plurality of graphics processors. More particularly, the present invention relates to an image processing apparatus for executing image processing by efficiently distributing its operation, and a method of the same.

As a method of improving its performance, a conventional image processing apparatus includes a plurality of graphics processors for executing image processing. Further, when graphics commands were continuously issued, the conventional image processing apparatus properly dispersed the graphics commands, and then executed processing for the dispersed graphics commands in parallel by the plurality of graphics processors.

On the other hand, in the case of another conventional image processing apparatus, the distribution of graphics commands to the plurality of graphics processors was controlled on the basis of the following factors: information regarding a state of occupied/unoccupied space, which indicated a spare space state of an input FIFO corresponding to each graphics processor; and the number of commands sent to each graphics processor.

However, any of the above-described conventional image processing apparatus was not provided with a function for monitoring a processing state (load) of each graphics processor during the distribution of graphics commands to the plurality of graphics processors. Consequently, even in the case of a graphics processor that continuously received heavy-load graphics commands the graphics commands continued to be distributed if its input FIFO had spare space and if the number of received commands was small. It can therefore be understood that the conventional image processing apparatus had a problem of deteriorated performance of image processing because of insufficient dispersion of loads.

SUMMARY OF THE INVENTION

The present invention was made to solve the foregoing problem inherent in the prior art. It is an object of the present invention to provide an image processing apparatus, which is capable of preventing deterioration of image processing performance caused by concentration of loads on one among a plurality of graphics processors. It is another object of the present invention to provide a method therefore. In order to achieve the above object, an image processing apparatus of the present invention calculates a load to be processed by itself on the basis of entered graphics commands and being processed graphics command. If the load exceeds a preset specified threshold value, then the apparatus outputs a high-load signal, which indicates that the load is excessive.

BRIEF DESCRIPTION OF THE DRAWINGS

The above and other objects, features and advantages of the present invention will become more apparent upon a reading of the following detailed description taken in conjunction with the accompanying drawings, in which.

DESCRIPTION OF THE PREFERRED EMBODIMENTS

Next, detailed description will be made of an image processing apparatus of a first embodiment of the present invention with reference to the accompanying drawings.

Figure 1:
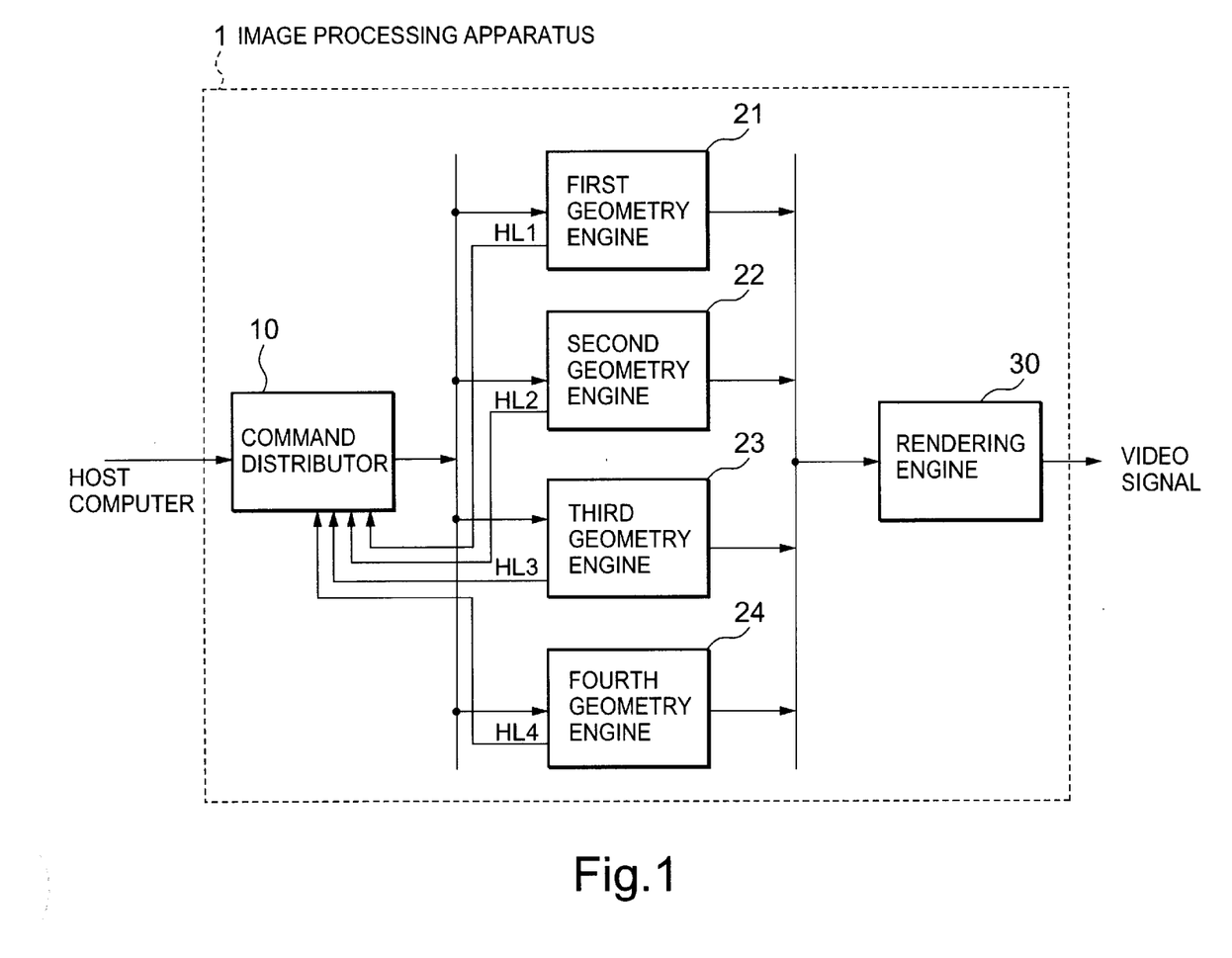
FIG. 1 is a block diagram showing a constitutional example of an image processing apparatus of the present invention.

As shown in FIG. 1, the image processing apparatus 1 of the first embodiment of the present invention comprises first to fourth geometry engines 21 to 24, each of which is a graphics processor for executing geometry processing based on a graphics command. The image processing apparatus 1 of the present invention further comprises a command distributor 10 for distributing graphics commands sent from a host computer respectively to the first to fourth geometry engines 21 to 24, and a rendering engine 30 for executing rendering processing based on a command output from each of the first to fourth geometry engines 21 to 24.

Each of the first to fourth geometry engines 21 to 24 calculates a load of its own geometry processing based on the graphics commands having transferred from the command distributor 10 and the graphics commands processed in the corresponding geometry engine. If the result of calculation shows that a load of geometry processing exceeds a specified threshold value, then each of high-load signals HL1 to HL4 indicating that the load is excessive because of concentration of graphics commands is output to the command distributor 10.

Upon having detected each of the high-load signals HL1 to HL4 from the first to fourth geometry engines 21 to 24, the command distributor 10 prohibits any graphics commands from being transferred to the corresponding geometry engine until the signal indicating the high-load state thereof is released.

Next, a constitutional example of the geometry engine shown in FIG. 1 will now be described.

Figure 2:
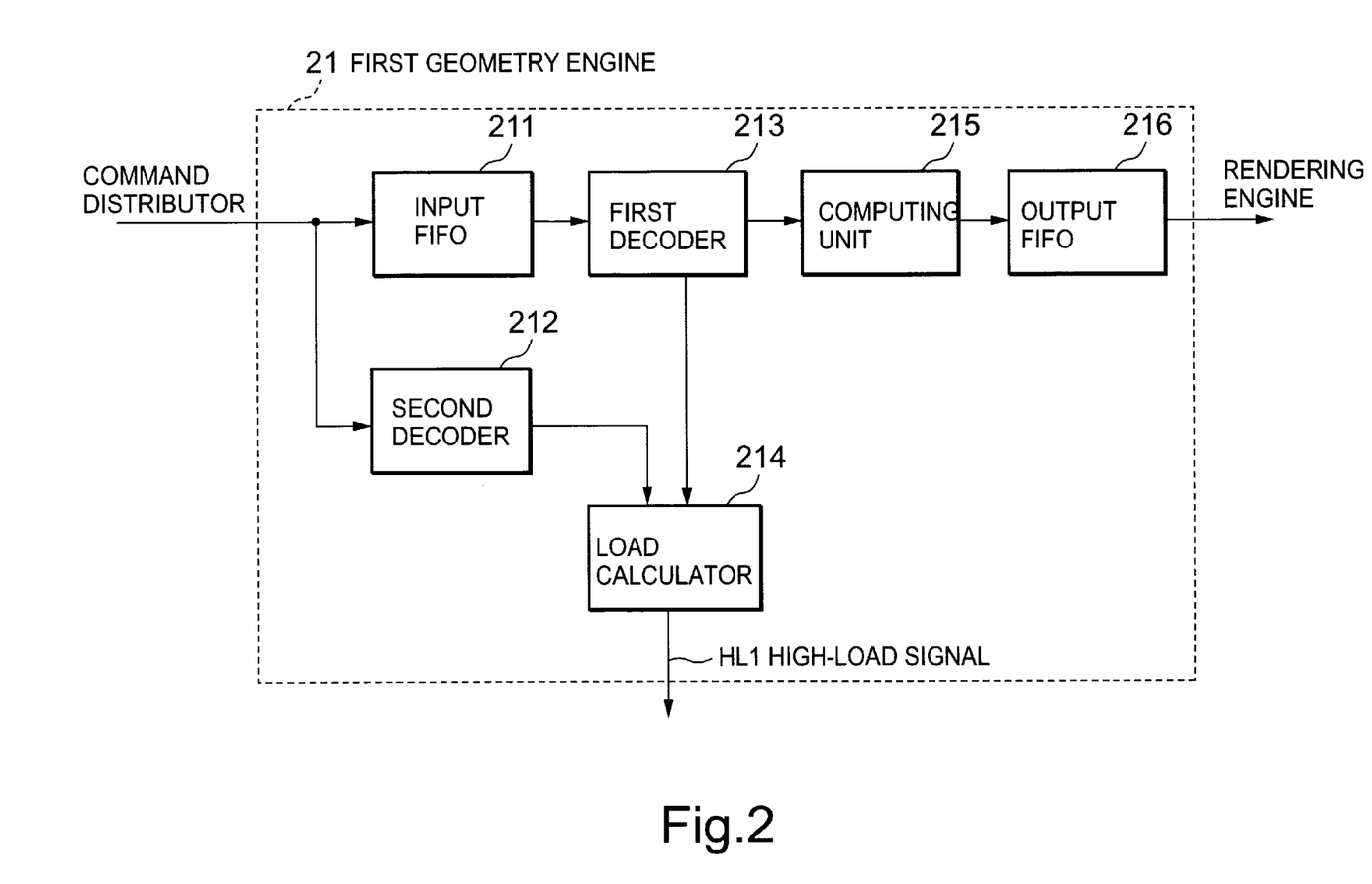
FIG. 2 is a block diagram showing a constitutional example of a geometry engine.

As shown in FIG. 2, the first geometry engine 21 includes an input FIFO 211, a first decoder 213, a second decoder 212, a computing unit 215, an output FIFO 216 and a load calculator 214. FIG. 2 shows constitution of a geometry engine by taking an example of the first geometry engine 21. But each of the other second to fourth geometry engines 22 to 24 employs like constitution.

The input FIFO 211 temporarily stores the graphics command transferred from the command distributor 10. The first decoder 213 decodes the graphics command output from the input FIFO 211, and issues a command to the computing unit 215. In addition to the issuance of a command to the computing unit 215, the first decoder 213 determines a kind of the graphics command, and notifies the load calculator 214 of the determined kind.

After having received the command from the first decoder 213, the computing unity 215 processes geometry processing for the graphics command. The output FIFO 216 temporarily stores a result of the geometry processing processed by the computing unit 215, and then outputs the result to the rendering engine 30.

The second decoder 212 directly decodes the graphics commands transferred from the command distributor 10 in sequence, determines the kinds of the graphics commands, and notifies the load calculators 214 of the determined kinds.

The load calculator 214 calculates a load of command processing for the first geometry engine 21 based on the outputs of the second and first decoders 212 and 213. If the result of calculation shows that the load exceeds a predetermined threshold value, then the load calculator 214 outputs a high-load signal HL1 indicating that the load is excessive.

The load calculator 214 and its operation will now be described in detail.

Figure 3:
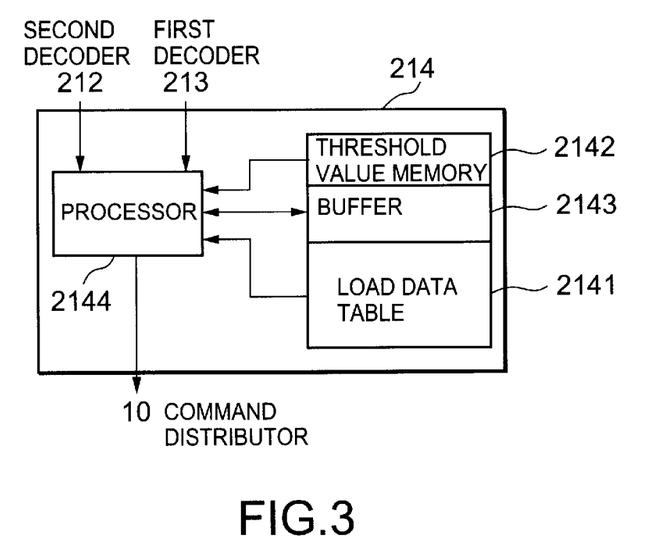
FIG. 3 is a block diagram showing an example of a load calculator of a first embodiment.

As shown in FIG. 3, the load calculator 214 includes a load data table 2141 where load information corresponding to each graphics command is recorded beforehand, a threshold value memory 2142 for storing a predetermined threshold value, a buffer 2143 for holding a result of load calculation, and a processor 2144.

Figure 4:
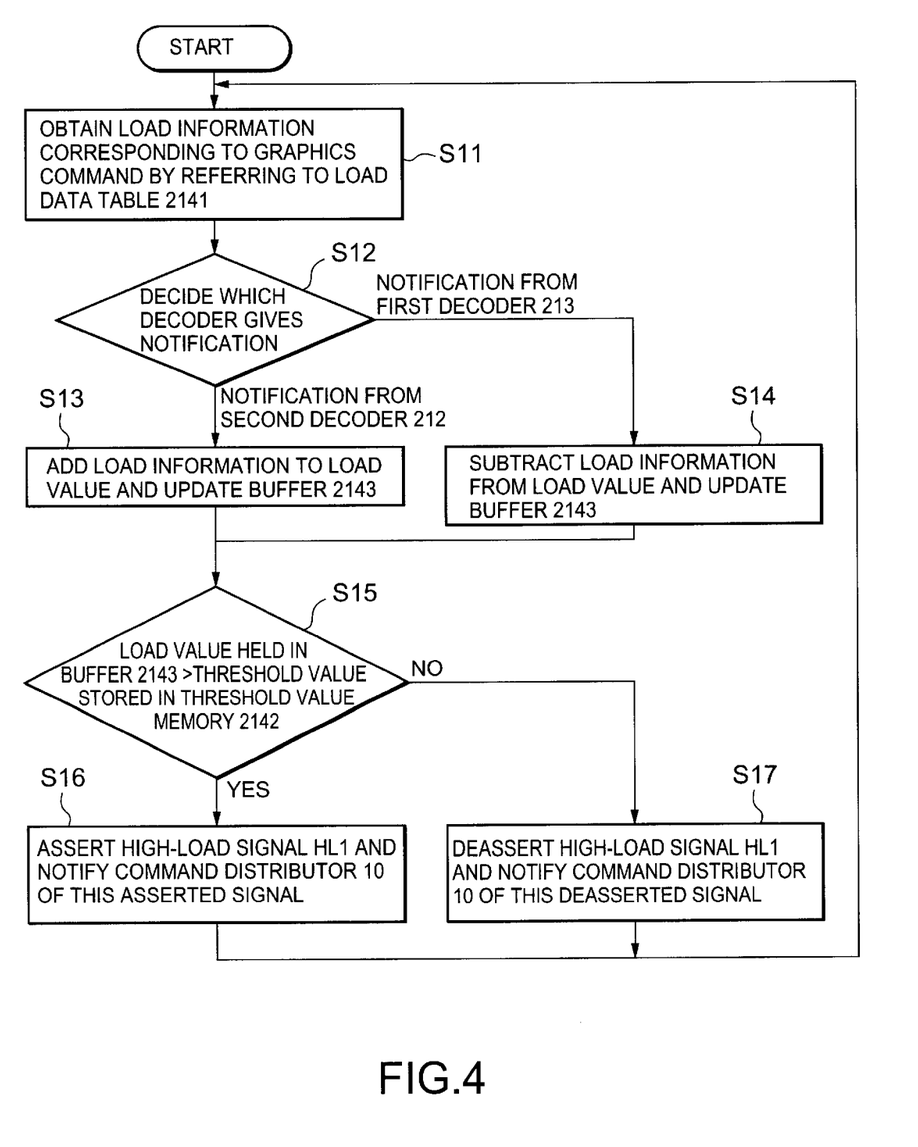
FIG. 4 is a flowchart showing a load detecting operation processed by the load calculator of the first embodiment.

As shown in FIGS. 3 and 4, upon having received the outputs of the first and second decoders 213 and 212, the processor 2144 obtains load information corresponding to each graphics command by referring to the load data table 2141 (S11 in FIG. 4). Also, the processor 2144 makes determination as to which of the decoders, the first 213 or the second 212, the received notification belongs to (S12). If the received notification is from the second decoder 212, then the processor 2144 adds the obtained load information to a load value (initial value "0") indicating the degree of a load placed on the geometry engine, which is held in the buffer 2143, and updates the data stored in the buffer 2143 (S13). On the other hand, if the received notification is from the first decoder 213, then the processor 2144 subtracts a value of the obtained load information from the load value indicating the degree of a load placed on the geometry engine, which is held in the buffer 2143, and updates the data stored in the buffer 2143 (S14).

Subsequently, the processor 2144 compares the load value held in the buffer 2143 with the threshold value stored in the threshold value memory 2142 (S15). If a result of the comparison shows that the load exceeds the threshold value, then the processor 2144 determines that the first geometry engine 21 is in a high-load state, and asserts a high-load signal HL1 to the command distributor 10 (S16). If the load is equal to the threshold value or lower, then the processor 2144 deasserts the high-load signal HL1, and notifies the command distributor 10 (S17).

It can therefore be understood that the load calculator 214 calculates the load placed on the geometry engine when a new output comes from the first decoder 213 after the completion of one geometry processing in the computing unit 215, alternatively when a new output comes from the second decoder 212 after the transfer of the graphics command from the command distributor 10.

Figure 5:
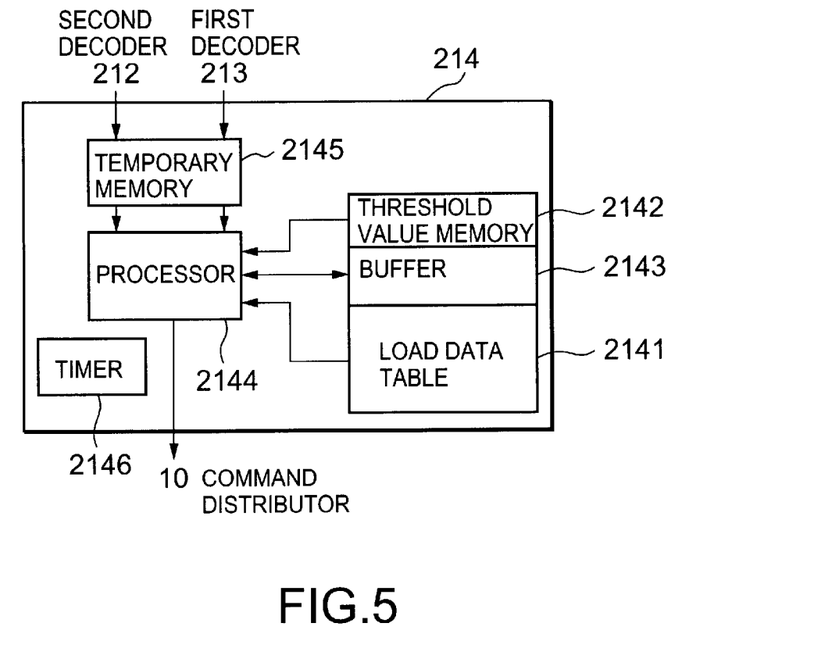
FIG. 5 is a block diagram showing another example of the load calculator.

Another constitutional possibility is, as shown in FIG. 5, that the load calculator 214 may be further provided with a temporary memory 2145 and a timer 2146. In this case, the load calculator 214 temporarily stores the inputs from the first and second decoders 213 and 212 in the temporary memory 2145, and then executes load calculation at every constant interval of time.

The command distributor 10 shown in FIG. 1 will now be described.

Figure 6:
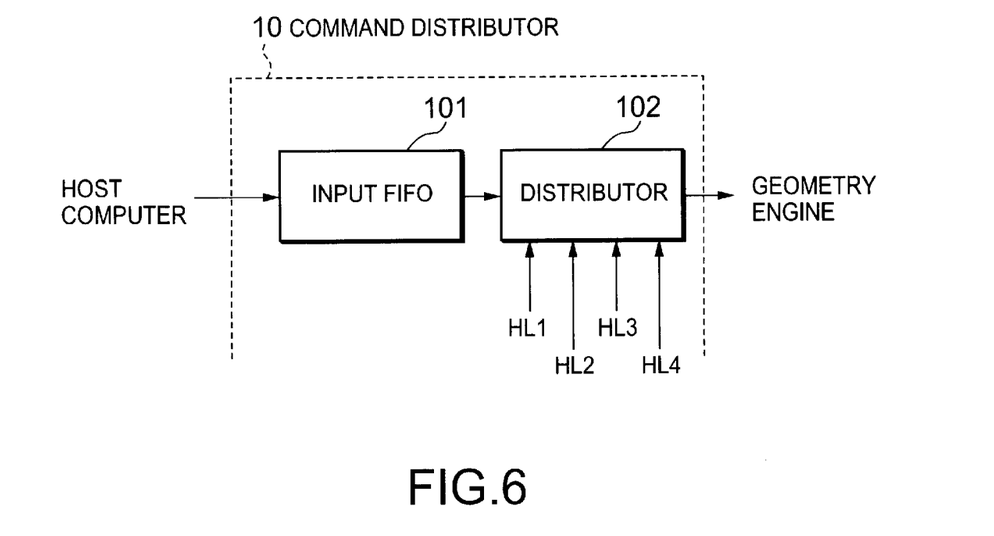
FIG. 6 is a block diagram showing a constitutional example of a command distributor.

As shown in FIG. 6, the command distributor 10 includes an input FIFO 101 for temporarily storing graphics commands from the host computer, and a distributor 102 for distributing commands outputted from the input FIFO 101 respectively to the first to fourth geometry engines 21 to 24.

Figure 7:
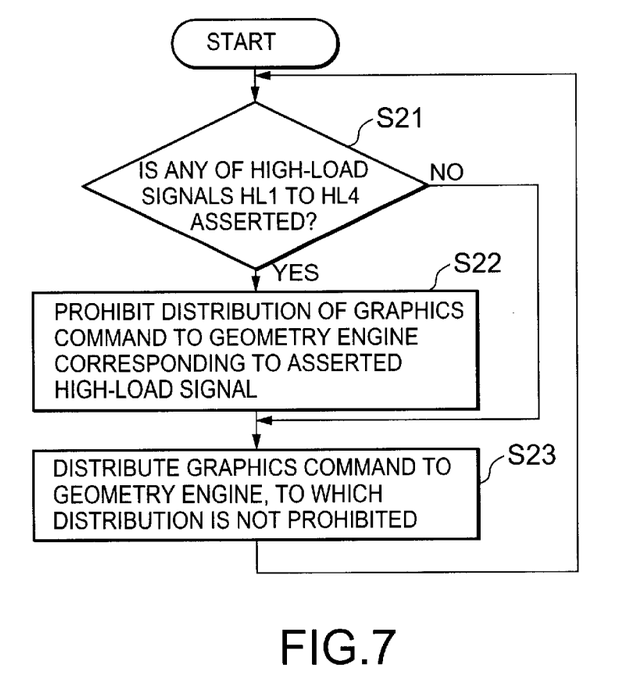
FIG. 7 is a flowchart showing an operation of the distributor.

As shown in FIG. 7, after having the commands outputted from the input FIFO 101, the distributor 102 refers to high-load signals HL1 to HL4 from the first to fourth geometry engines 21 to 24, and then makes determination as to whether or not any one of the high-load signals HL1 to HL4 has been asserted (S21). If a result of the determination shows that one of the high-load signals HL1 to HL4 has been asserted, then the distributor 102 prohibits any graphics commands from being distributed to the geometry engine corresponding to the asserted high-load signal (S22) Then, the distributor 102 distributes the graphics commands to the geometry engines, to which distribution is not prohibited (S23).

Thus, the distributor 102 usually distributes the commands outputted from the input FIFO 101 respectively to the first to fourth geometry engines 21 to 24. But if the high-load signal HL1 is asserted from the first geometry engine 21, the distributor 102 prohibits any graphics commands from being distributed to the first geometry engine 21. The distributor 102 distributes the graphics commands from the input FIFO 101 respectively to the second to fourth geometry engines 22 to 24. If there is another assertion, that is, if the high-load signal HL4 is asserted from the fourth geometry engine 24, the distributor 102 prohibits any graphics commands from being distributed to the fourth geometry engine 24, and then the distributor 102 distributes the commands outputted from the input FIFO 101 respectively to the rest, second and third, geometry engines 22 and 23. Then, if the high-load signal HL1 from the first geometry engine 21 is deasserted, the distributor 102 cancels the prohibition of the first geometry engine 21, and distributes the commands outputted from the input FIFO 101 respectively to the first to third geometry engines 21 to 23.

It can therefore be understood that the distributor 102 is provided with functions for monitoring the high-load signals HL1 to HL4 from the first to fourth geometry engines 21 to 24, prohibiting any output commands from being distributed to the geometry engine in which has the high-load signal has been asserted, and distributing the commands to the other geometry engines.

Next, description will be made of a specific operation of the image processing apparatus of the present invention by referring to FIGS. 1 to 7 and also FIGS. 8 to 15.

Figure 8:
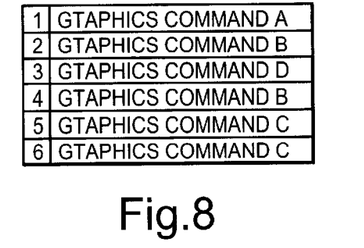
FIG. 8 is a table view showing an example of graphics commands.
Figure 9:
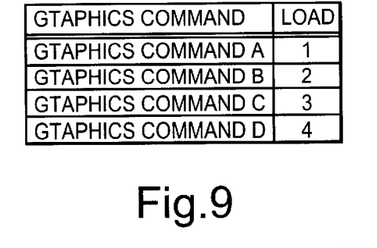
FIG. 9 is a table view showing a load data table provided in the load calculator.

In the description, it is assumed that graphics commands are transferred from the command distributor 10 to the first geometry engine 21 in the order shown in FIG. 8. It is also assumed that loads corresponding to graphics commands take values in the load data table 2141 shown in FIG. 9, and a threshold value of the threshold value memory 2142 is set to "10".

First, consideration is given to a case where the graphics commands up to the fourth, command, the graphics command B, shown in FIG. 8 are entered to the input FIFO 211 of the first geometry engine 21, and the computing unit 215 executes geometry processing for the first command, the graphics command A. Further, it is assumed herein that the first graphics command A is outputted from the first decoder 213 by timing (time T1) shown in FIG. 15.

In this case, the load calculator 214 of the first geometry engine 21 subtracts a load of the first graphics command A from a total of loads of the first to fourth graphics commands, and sets a value thus obtained as a load placed on the first geometry engine 21. In other words, referring to the load data table 2141 of the graphics commands shown in FIG. 9, a load placed on the first geometry engine 21 becomes "8" (2+4+2=8) as shown in FIG. 10.

Figure 15:
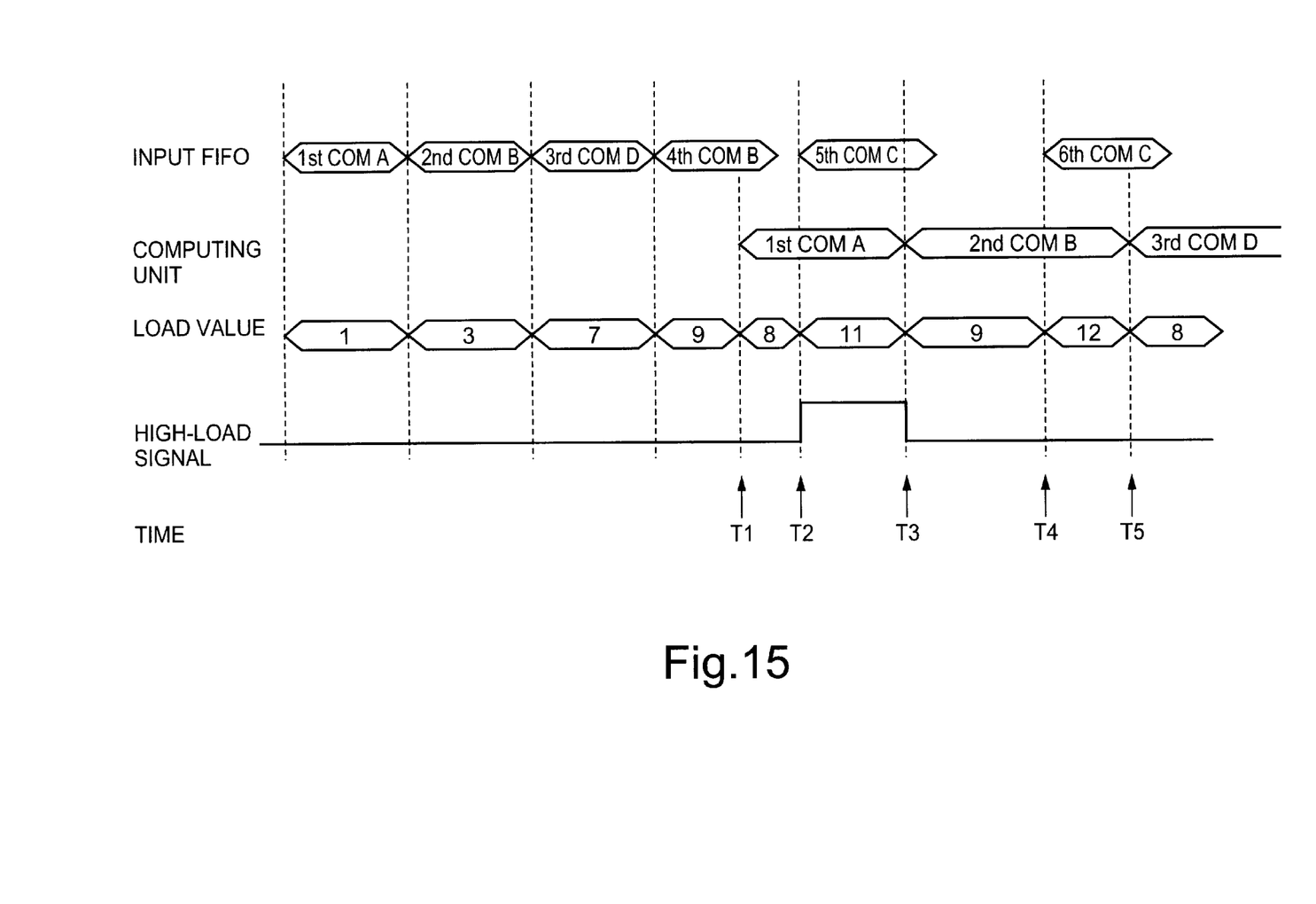
FIG. 15 is a timing chart showing an operational state of the first embodiment.

Next, consideration is given to a case where a fifth graphics command C shown in FIG. 8 is transferred from the command distributor 10 (time T2 in FIG. 15).

Figures 10, 11:
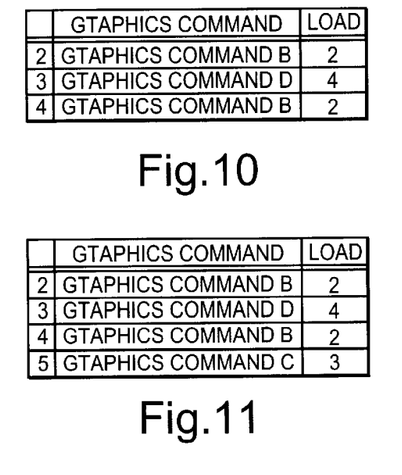
FIGS. 10 to 14 are table views, each of which shows a load state of the geometry engine.

In this case, a new output is made from the second decoder 212, and the load placed on the first geometry engine 21 becomes "11" (2+4+2+3=11) as shown in FIG. 11. Thus, since the load exceeds the threshold value "10", the processor 2144 asserts a high-load signal HL1. Thereafter, in the command distributor 10, any graphics commands are prohibited from being transferred to the first geometry engine 21.

Next, consideration is given to a case where no graphics commands are transferred from the command distributor 10, geometry processing is finished for the first graphics command A and new geometry processing is executed for the second graphics command B (time T3 in FIG. 15).

Figure 12:
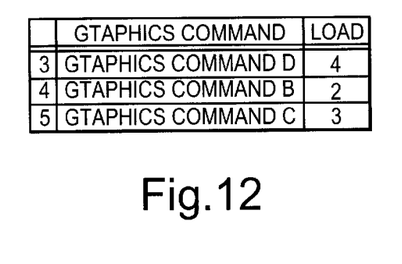

In this case, as a result of a new output made by the first decoder 213, the load placed on the first geometry engine 21 becomes "9" (4+2+3=9) as shown in FIG. 12. Thus, the load is lower than the threshold value "10" and the processor 2144 deasserts the high-load signal HL1. Accordingly, the command distributor 10 releases the prohibition of graphics command transfer to the first geometry engine 21.

Next, consideration is given to a case where a sixth graphics command C is transferred from the command distributor 10 (time T4 in FIG. 15), and then the computing unit 215 finished geometry processing for the second graphics command B and starts geometry processing for the third graphics command D (time T5 in FIG. 15).

Figure 13:
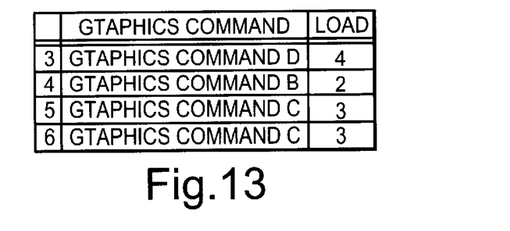

In this case, at time T4 in FIG. 15, the load placed on the first geometry engine 21 is "9" and the processor 2144 deasserts the high-load signal HL1. Therefore, the command distributor 10 transfers the sixth graphics command C to the first geometry engine 21. Then, the load placed on the first geometry engine 21 becomes "12" (4+2+3+3=12) as shown in FIG. 13. Since the load exceeds the threshold value "10" in this case, the processor 2144 asserts the high-load signal HL1. As a result, in the command distributor 10, any graphics commands are prohibited from being transferred to the first geometry engine 21.

Figure 14:
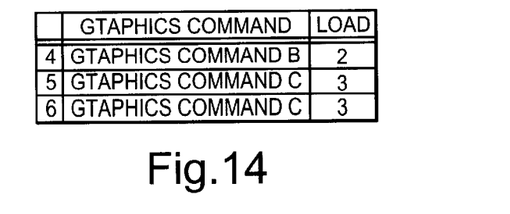

Then, in the first geometry engine 21, geometry processing is finished for the second graphics command B and new geometry processing is executed for the third graphics command D (time T5 in FIG. 15). Accordingly, the load placed on the first geometry engine 21 becomes "8" (2+3+3=8) as shown in FIG. 14. In this case, since the load is lower than the threshold value "10", the processor 2144 deasserts the high-load signal HL1. Then, the command distributor 10 determines that a next graphics command can be transferred to the first geometry engine 21.

As apparent from the foregoing, in accordance with the first embodiment of the present invention, since the transfer of graphics commands to the geometry engine placed in a high-load state is prohibited, load concentration in a particular geometry engine can be prevented. Therefore, since the image processing apparatus of the present invention can increase processing efficiency of the rendering engine in the next stage, any reductions in image processing performance of the apparatus can be prevented.

Figure 16:
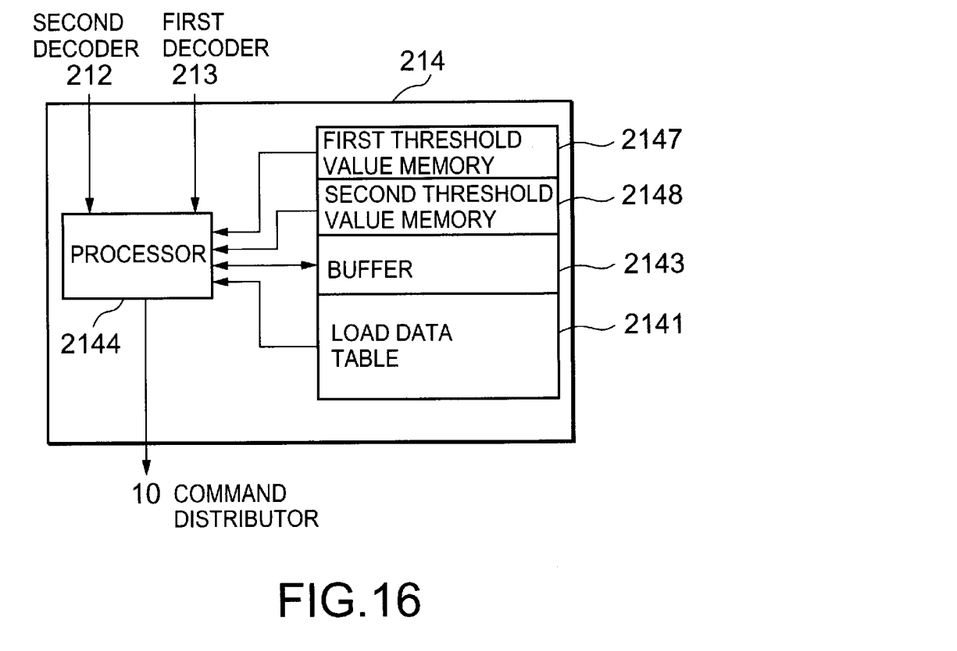
FIG. 16 is a block diagram showing an example of a load calculator of a second embodiment of the present invention.

Next, description will be made of a second embodiment of the present invention. As shown in FIG. 16, in accordance with the second embodiment of the present invention, the load calculator 214 includes a first threshold value memory 2147 and a second threshold value memory 2148 instead of the threshold value memory 2142 shown in FIG. 3. The first threshold value memory 2147 holds a first threshold value used to determine whether a corresponding geometry engine has reached a high-load state or not as a result of load calculation. The second threshold value memory 2148 holds a second threshold value lower than that of the first threshold value memory 2147. The second threshold value is used as a reference for determining whether the high-load state of the geometry engine has been released or not.

Figure 17:
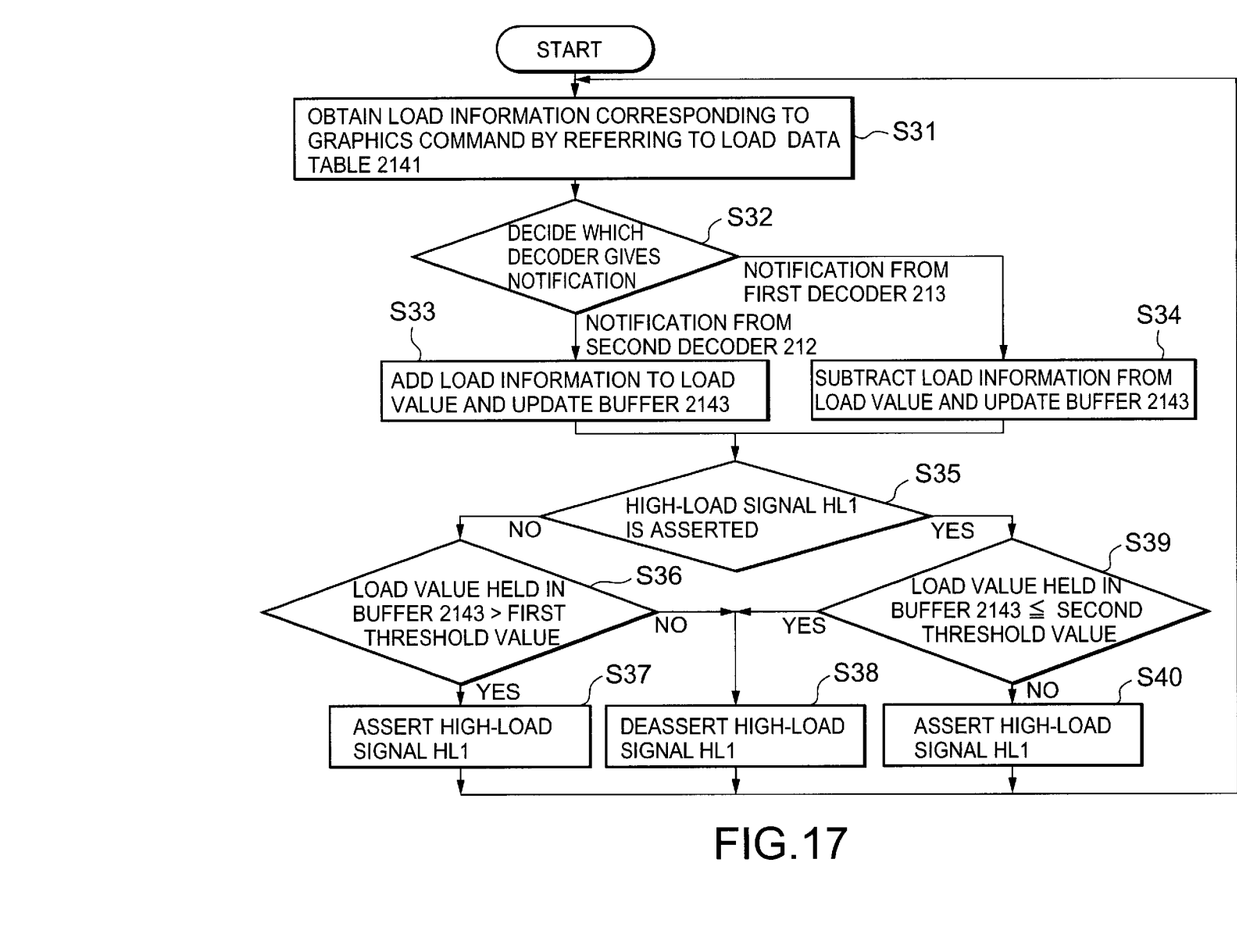
FIG. 17 is a flowchart showing a load detecting operation processed by the load calculator of the second embodiment.

As shown in FIGS. 16 and 17, when having received inputs from the first and second decoders 213 and 212, the processor 2144 obtains load information corresponding to each graphics command by referring to the load data table 2141 (S31 in FIG. 17). Also, the processor 2144 makes determination as to which of the decoders, the first 213 or the second 212, the received notification belongs to (S32). If the received notification is from the second decoder 212, then the processor 2144 adds the obtained load information to a load value (initial value "0") indicating the degree of a load placed on the geometry engine, which is held in the buffer 2143, and updates the data stored in the buffer 2143 (S33). On the other hand, if the received notification is from the first decoder 213, then the processor 2144 subtracts the obtained load information value from the load value indicating the degree of a load placed on the geometry engine, which is held in the buffer 2143, and updates the data stored in the buffer 2143 (S34).

Subsequently, the processor 2144 determines whether a high-load signal HL1 has been asserted or deasserted (S35). If the high-load signal HL1 has been deasserted, then the processor 2144 compares the load value held in the buffer 2143 with the first threshold value stored in the first threshold value memory 2147 (S36). If a result of the comparison shows that the load exceeds the first threshold value, then the processor 2144 determines that the first geometry engine 21 is in a high-load state, and asserts the high-load signal HL1 to the command distributor 10 (S37). If the load is equal to the first threshold value or lower, then the processor 2144 continues to deassert the high-load signal HL1 to the distributor 10 (S38). On the other hand, if the high-load signal HL1 has been asserted, then the processor 2144 compares the load value held in the buffer 2143 with the second threshold value stored in the second threshold value memory 2147 (S39). If a result of the comparison shows that the load is equal to the second threshold value or lower, then the processor 2144 determines that the high-load state of the first geometry engine 21 has been released, and deasserts the high-load signal HL1 to the command distributor 10 (S38). If the load is larger than the second threshold value, then the processor 2144 continues to assert the high-load signal HL1 to the distributor 10 (S40).

Thus, in accordance with the second embodiment, after having determined that the geometry engine is in a high-load state (load>first threshold value), the processor 2144 prohibits a next graphics command from being distributed until the load is reduced by a given amount (load≦second threshold value). Accordingly, the geometry engine that has been in a high-load state before can be prevented from being immediately placed in a high-load state again, and the distribution of graphics commands can be smoothed.

Furthermore, description will now be made of an operation of the image processing apparatus of the second embodiment of the invention.

In the description, it is assumed that graphics commands are transferred from the command distributor 10 to the first geometry engine 21 in the order shown in FIG. 8. Also, it is assumed that loads corresponding to graphics commands take values shown in the load data table 2141 of FIG. 9, a threshold value of the first threshold value memory 2147 is set to "10", and a threshold value of the second threshold value memory 2148 is set to "6".

Figure 18:
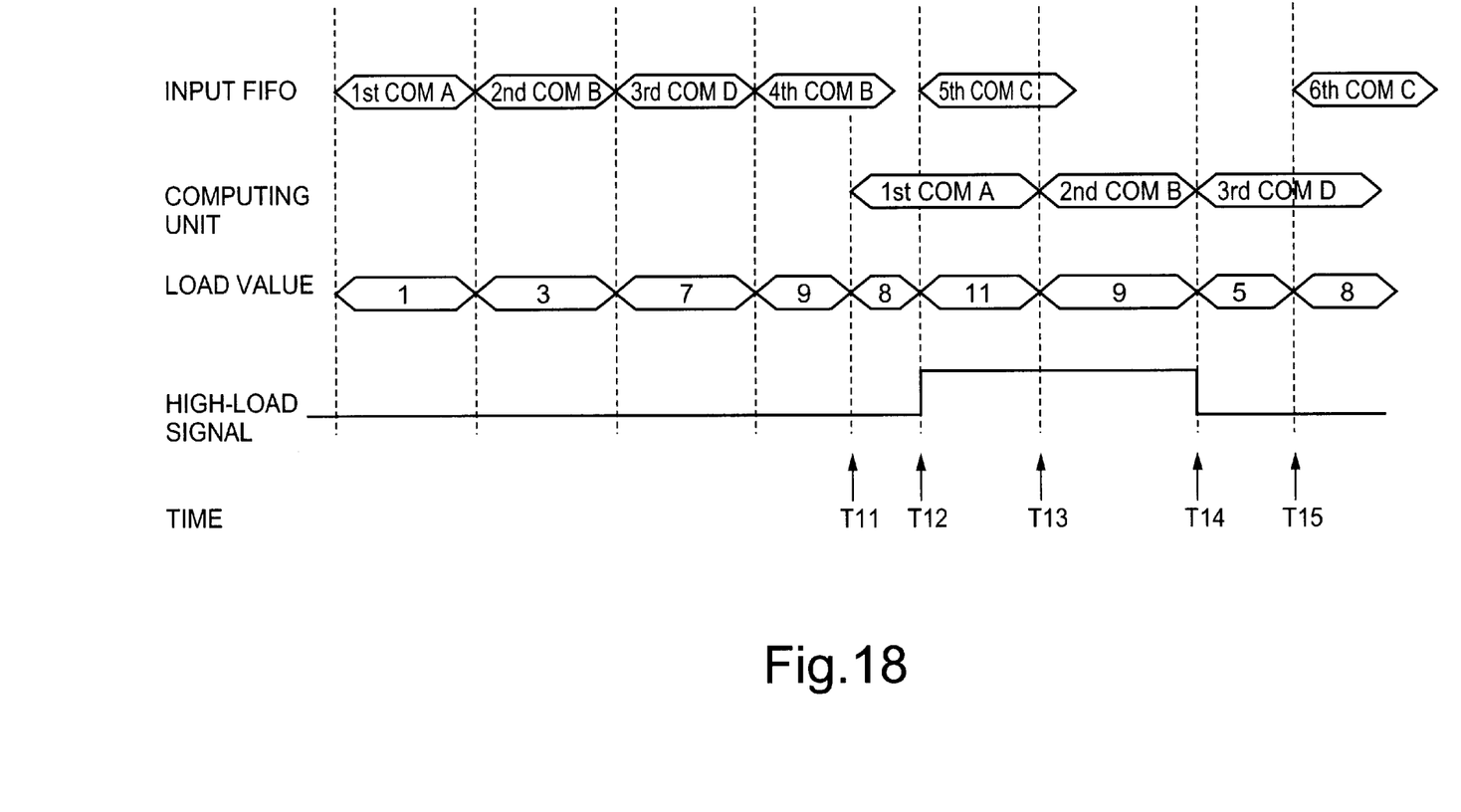
FIG. 18 is a timing chart showing an operational state of the second embodiment.

First, by referring to FIG. 18, consideration is given to a case where the graphics commands up to the fourth shown in FIG. 8 are input to the input FIFO 211 of the first geometry engine 21, and the processor 2144 deasserts the high-load signal HL1 to the command distributor 10. Further, the computing unit 215 executes geometry processing for the first graphics command A. It is assumed herein that the first graphics command A is outputted from the first decoder 213 by timing (time T11 shown in FIG. 18).

In this case, in the load calculator 214 of the first geometry engine 21, the load placed on the first geometry engine 21 becomes "8" (2+4+2=8) as shown in FIG. 10. As the high-load signal HL1 is deasserted, the processor 2144 compares the load with the first threshold value. The processor 2144 keeps deasserting the high-load signal HL1, because the load is lower than the first threshold value "10". Accordingly, the command distributor 10 determines that a next graphics command can be transferred to the first geometry engine 21.

Then, if a fifth graphics command C is transferred from the command distributor 10 (time T12), a new output is made from the second decoder 212, and the load placed on the first geometry engine 21 becomes "11" (2+4+2+3=11) as shown in FIG. 11. As the high-load signal HL1 is deasserted, the processor 2144 compares the load with the first threshold value. As a result of comparison, since the processor 2144 determines the load exceeds the first threshold value "10", the processor 2144 asserts a high-load HL1. Thereafter, in the command distributor 10, any graphics commands are prohibited from being transferred to the first geometry engine 21.

Next, consideration is given to a case where no graphics commands are transferred from the command distributor 10 because of the asserting of a high-load HL1, geometry processing is finished for the first graphic command A, and new geometry processing is executed for the second graphics command B (time T13).

In this case, as a result of a new output made from the first decoder 213, the load placed on the first geometry engine 21 becomes "9" (4+2+3=9) as shown in FIG. 12. As the high-load signal HL1 is asserted, the processor 2144 compares the load with the second threshold value. However, the processor 2144 keeps asserting the high-load signal HL1, because the load exceeds the second threshold value "6". Accordingly, in the command distributor 10, the prohibition of graphics command transfer to the first geometry engine 21 is not released.

Figure 19:
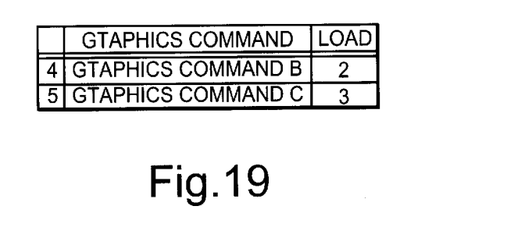
FIG. 19 is a table view showing a load state of a geometry engine.

Further, at time T14, the computing unit 215 finishes the geometry processing for the second graphics command B, and the computing unit 215 starts geometry processing for the third graphics command D. Then, the load placed on the first geometry engine 21 becomes "5" (2+3=5) as shown in FIG. 19. As the high-load signal HL1 is asserted, the processor 2144 compares the load with the second threshold value. The load is obviously lower than the second threshold value "6" and the processor 2144 deasserts the high-load signal HL1. Accordingly, the command distributor 10 determines that a next graphics command can be transferred to the first geometry engine 21.

Then, at time T15, when the sixth graphics command C is transferred from the command distributor 10, the load becomes "8" (2+3+3=8) as shown in FIG. 14. As the high-load signal HL1 has been deasserted, the processor 2144 compares the load with the first threshold value. However, the deasserted state of the high-load signal HL1 is maintained, because the load is lower than the first threshold value "10".

As described above, in accordance with the second embodiment of the present invention, the processor 2144 prohibits the transfer of any graphics commands to the geometry engine having a load higher than the first threshold value until the load is reduced to be equal to the second threshold value or lower. Thus, the geometry engine that has been placed in a high-load state before can be prevented from being immediately placed in the high-load state again, and processing efficiency of the rendering engine in the next stage can be increased. As a result, any reductions in image processing performance of the image processing apparatus can be prevented.

Figure 20:
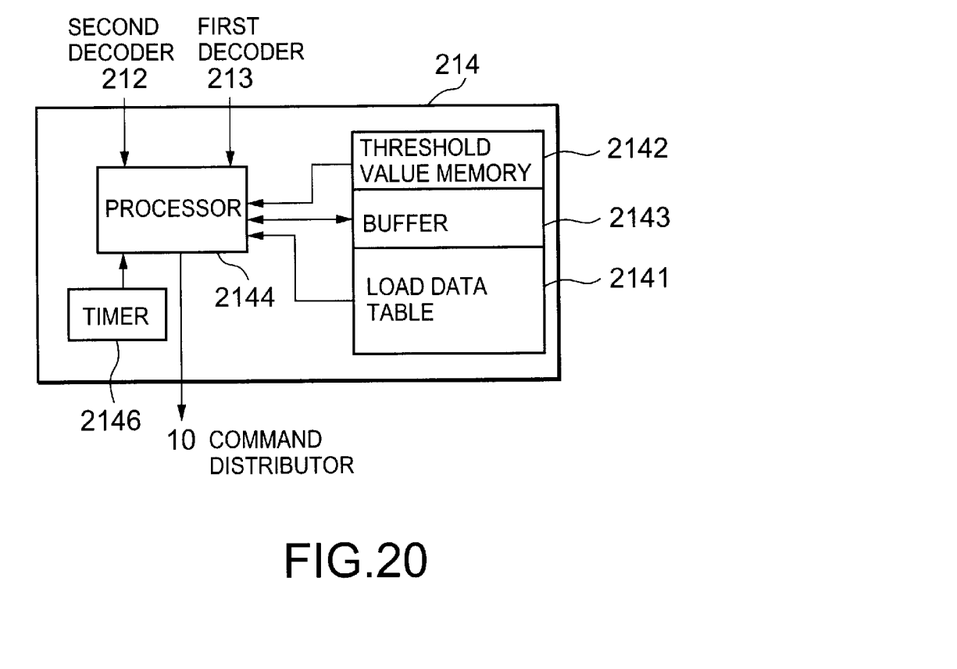
FIG. 20 is a block diagram showing an example of a load calculator of a third embodiment of the present invention.

Furthermore, in accordance with a third embodiment of the present invention, a timer 2146 is provided to count fixed time as shown in FIG. 20. In the third embodiment, the processor 2144 deasserts the high-load signal HL1 after a passage of fixed time rather than by timing using a threshold value (or the second threshold value) as a reference, when the high-load signal HL1 of the geometry engine having been asserted. The timer 2146 counts fixed time by using asserting of the high-load signal HL1 as a trigger for the timer 2146. Then, receiving a report of the passage of fixed time from the timer 2146, the processor 2144 deasserts the high-load signal HL1.

In accordance with the third embodiment of the present invention, the processor 2144 prohibits the transfer of graphics commands to the geometry engine, having a load higher than the threshold value, for fixed time. Accordingly, the geometry, engine that has been placed in a high-load state before can be prevented from being immediately placed in the high-load stage again, and processing efficiency of the rendering engine in the next stage can be increased. As a result, any reductions in image processing performance of the image processing apparatus can be prevented.

As described above, with the image processing apparatus of the present invention, since the transfer of graphics commands to the geometry engine having a high load is prohibited, load concentration in a particular geometry engine can be prevented. Therefore, since the image processing apparatus of the present invention can increase processing efficiency of the rendering engine in the next stage, it is possible to prevent any reductions in image processing performance of the same.

The present invention has been described by taking an example of the four geometry engines operated in parallel. But the number of geometry engines should not be limited to four. The number of geometry engines may be increased to N, and the number of high-load signal input ports of the command distributor may be increased to N. Similar effects can be obtained in this case.

Values of the graphics commands in the load data table and load threshold value data used in the load calculator may be varied from the host computer rather than being fixed.

Furthermore, to improve performance of the image processing apparatus by operating the rendering engines in parallel, a device similar to the above-described command distributor may be provided in the input side of the rendering engine, and each rendering engine may employ the same constitution as that of the geometry engine. Thus, concentration of rendering processing loads in a particular rendering engine can be prevented.

What is claimed is:

1. An image processing apparatus comprising:
a plurality of graphics processors for processing image processing in parallel,
wherein each of said plurality of graphics processors comprises a load calculator for calculating a load of processing placed on its own geometry engine on the basis of inputted graphics commands and outputting a high-load signal indicating that the load is excessive if the load exceeds a present specified threshold value,
a command distributor for distributing graphics commands to said plurality of graphics processors,
wherein said command distributor monitors the high-load signal outputted from the graphics processor, prohibits transfer of the graphics commands to the graphics processor that has output the high-load signal, and distributes the graphics commands to the other graphics processors, to which transfer of the graphics commands is unprohibited, and
wherein each of said plurality of graphics processors comprising:
an input memory for temporarily holding the graphics commands distributed from said command distributor, and a decoder for determining kinds of the graphics commands inputted from said command distributor and notifying the load calculator of the determined kinds.

2. The image processing apparatus according to claim 1, each of said plurality of graphics processors comprising:
a load data table for storing a load value corresponding to each of the graphics commands,
wherein said load calculator calculates the load placed on the geometry engine by referring to the load data table.

3. An image processing apparatus comprising:
a plurality of graphics processors for processing image processing in parallel,
wherein each of said plurality of graphics processors comprises a load calculator for calculating a load of processing placed on its own geometry engine on the basis of inputted graphics commands and outputting a high-load signal indicating that the load is excessive if the load exceeds a present specified threshold value,
and wherein each of said plurality of graphics processors comprising:
an input memory for temporarily holding the graphics commands distributed from said command distributor:
a computing unit for processing image processing for the graphics command inputted from said input memory;
a first decoder for determining kinds of the graphics commands used for an operation processed by the graphics processor and notifying said load calculator of the determining kinds; and
a second decoder for determining kinds of entered graphics commands and notifying said load calculator of the determining kinds,
wherein said load calculator calculates the load placed on the graphics processor on the basis of notification from said first and second decoders.

4. The image processing apparatus according to claim 3, said load calculator comprising:
a load data table for recording a load value corresponding to each of the graphics commands: and
a processor for calculating the load calculation,
wherein said processor receives notification from said first and second decoders, and executes load calculation by referring to the load data table.

5. The image processing apparatus according to claim 4, said load calculator further comprising:
a threshold value memory for storing a threshold value,
wherein said processor asserts the high-load signal if a load value obtained by the load calculation exceeds the threshold value, and deasserts the high-load signal if the calculated load value is equal to the threshold value, alternatively lower.

6. The image processing apparatus according to claim 5, said load calculator further comprising:
a buffer for holding the calculated load value,
wherein said processor receives notification from said first and second decoders, obtains a load value corresponding to a notified kind of a graphics command by referring to the load data table, subtracts the obtained load value from the load value held in the buffer if the notification is from the first decoder, adds the obtained load value to the load value held in the buffer if the notification is from the second decoder, and then updates the value in the buffer.

7. The image processing apparatus according to claim 4, said load calculator further comprising:
a first threshold value memory for storing a preset first threshold value; and
a second threshold value memory for storing a preset second threshold value,
wherein said processor asserts the high-load signal if a load value calculated by keeping the high-load signal in a deasserted state exceeds the first threshold value, and deasserts the high-load signal if the load value calculated by keeping the high-load signal in an asserted state is equal to the second threshold value, alternatively lower.

8. The image processing apparatus according to claim 4, said load calculator further comprising:
a threshold value memory for storing a preset threshold value, and a timer for counting specified time,
wherein said processor asserts the high-load signal and said timer starts counting time if a load value obtained by calculation exceeds the threshold value, and said processor deasserts the high-load signal after fixed time is counted by said timer.

9. The image processing apparatus according to claim 4, said load calculator further comprising:
- a temporary memory for temporarily holding notification from said first and second decoders; and
- a timer for counting specified time,
- wherein upon receiving notification of a passage of specified time from said timer, said processor reads the notification which has been held in from said temporary memory, and then executes load calculation.

10. The image processing apparatus according to claim 3, wherein said load calculator calculates the load placed on the graphics processor each time it receives notification from the first decoder, alternatively the second decoder.

11. An image processing method for processing image processing by a plurality of graphics processors, comprising the steps of:
- calculating a load value of each of said plurality of graphics processors on the basis of inputted graphics commands and being processed graphics commands;
- asserting a high-load signal indicating that a load placed on the graphics processor is excessive if the calculated load value exceeds a preset specified threshold value;
- deasserting the high-load signal if the calculated load value is equal to the preset specified threshold value, alternatively lower; and
- prohibiting any graphics commands from being transferred to the graphics processor which asserting the high-load signal,
- wherein said calculating is performed for each of the graphics processors by referring to a table which provided beforehand for storing data indicating a load relationship to each of said graphics commands,
- wherein said calculating if notification regarding processing of the graphics processor is received, a load value corresponding to the graphics command is subtracted from the load value of the corresponding graphics processor, and
- if notification regarding an input of the graphics command is received, a load value corresponding to the graphics command is added to the load value of the graphics processor, and then the load value of the graphics processor is updated, and
- wherein while the high-load signal is in a deasserted state, the high-load signal is asserted when the calculated load value exceeds a preset specified first threshold value, and while the high-loan signal is in an asserted state, the high-load signal is deasserted when the calculated load value becomes equal to a preset specified second threshold value, alternatively lower.

12. An image processing method for processing image processing by a plurality of graphics processors, comprising the steps of:
- calculating a load value of each of said plurality of graphics processors on the basis of inputted graphics commands and being processed graphics commands;
- asserting a high-load signal indicating that a load placed on the graphics processor is excessive if the calculated load value exceeds a preset specified threshold value;
- deasserting the high-load signal if the calculated load value is equal to the preset specified threshold value, alternatively lower; and
- prohibiting any graphics commands from being transferred to the graphics processor which asserting the high-load signal,
- wherein said calculating is performed for each of the graphics processors by referring to a table which provided beforehand for storing data indicating a load relationship to each of said graphics commands,
- wherein said calculating if notification regarding processing of the graphics processor is received, a load value corresponding to the graphics command is subtracted from the load value of the corresponding graphics processor, and
- if notification regarding an input of the graphics command is received, a load value corresponding to the graphics command is added to the load value of the graphics processor, and then the load value of the graphics processor is updated, and
- wherein after the asserting of the high-load signal, the high-load signal is deasserted after a passage of specified time.

* * * * *